(12) United States Patent
Brooks et al.

(10) Patent No.: US 11,646,872 B2
(45) Date of Patent: May 9, 2023

(54) MANAGEMENT OF ACCESS AUTHORIZATION USING AN IMMUTABLE LEDGER

(71) Applicant: Clemson University, Clemson, SC (US)

(72) Inventors: Richard R. Brooks, Clemson, SC (US); Lu Yu, Clemson, SC (US); Anthony Skjellum, Knoxville, TN (US)

(73) Assignees: Clemson University, Clemson, SC (US); University of Tennessee Research Foundation, Knoxville, TN (US)

( * ) Notice: Subject to any disclaimer, the term of this patent is extended or adjusted under 35 U.S.C. 154(b) by 28 days.

(21) Appl. No.: 17/235,279

(22) Filed: Apr. 20, 2021

(65) Prior Publication Data

US 2021/0328777 A1    Oct. 21, 2021

Related U.S. Application Data

(60) Provisional application No. 63/012,320, filed on Apr. 20, 2020.

(51) Int. Cl.
*H04L 9/08* (2006.01)
*H04L 9/32* (2006.01)
(Continued)

(52) U.S. Cl.
CPC ........ *H04L 9/0822* (2013.01); *G06F 21/6209* (2013.01); *G06F 21/6218* (2013.01);
(Continued)

(58) Field of Classification Search
CPC ....... H04L 9/08; H04L 9/0822; H04L 9/0836; H04L 9/0894; H04L 9/088; H04L 9/32;
(Continued)

(56) References Cited

U.S. PATENT DOCUMENTS

| | | |
|---|---|---|
| 1,547,164 A | 7/1925 | Collins |
| 5,220,606 A | 6/1993 | Greenberg |

(Continued)

OTHER PUBLICATIONS

Orman, Hilarie, Blockchain: the Emperor's New PKI?, Dept: Practical Security, IEEE Internet Computing, 1089-7801/18, Mar./Apr. 2018 (www.computer.org/internet), Mar./Apr. 2018.
(Continued)

*Primary Examiner* — Shaqueal D Wade-Wright
(74) *Attorney, Agent, or Firm* — Kim and Lahey Law Firm, LLC; Douglas W. Kim (57) ABSTRACT

The system can be for the management of access authorization using an immutable ledger comprising and can include a server having a computer readable medium in communications with an immutable ledger. A set of computer readable instructions can be included in the server and can be configured for: receiving a set of data, encrypting the set of data with a data-encryption-key and storing the encrypted data on the immutable ledger, creating a key tree having a node associated with a user, creating a key-encryption-key associated with the node and the user, and, distributing the key-encryption-key to the user wherein the key-encryption-key is configured to decrypt the data-encryption-key thereby providing access to the data for the user.

18 Claims, 4 Drawing Sheets

(51) Int. Cl.
*H04L 9/00* (2022.01)
*G06F 21/62* (2013.01)

(52) U.S. Cl.
CPC .......... *H04L 9/0836* (2013.01); *H04L 9/0894* (2013.01); *H04L 9/3297* (2013.01); *H04L 9/50* (2022.05)

(58) Field of Classification Search
CPC ..... H04L 9/3297; H04L 63/10; H04L 63/101; G06F 21/62; G06F 21/6218
See application file for complete search history.

(56) References Cited

U.S. PATENT DOCUMENTS

| | | |
|---|---|---|
| 5,471,190 A | 11/1995 | Zimmermann |
| 5,539,827 A | 7/1996 | Liu |
| 5,684,950 A | 11/1997 | Dare et al. |
| 5,809,140 A | 9/1998 | Rubin et al. |
| 6,463,475 B1 | 10/2002 | Calhoun |
| 7,120,793 B2 | 10/2006 | Hope et al. |
| 8,666,065 B2 | 3/2014 | Zuili |
| 9,858,433 B2* | 1/2018 | Hammoutene ....... H04L 9/0836 |
| 2002/0095604 A1 | 7/2002 | Hausler |
| 2011/0014223 A1 | 6/2011 | Zuili |
| 2021/0160227 A1* | 5/2021 | Li ...................... G06Q 20/3829 |
| 2021/0273812 A1* | 9/2021 | Hardin .................. H04L 9/0822 |
| 2021/0377001 A1* | 12/2021 | Schrage ................ H04L 9/3239 |

OTHER PUBLICATIONS

Zyskind, Guy et al., Decentralizing Privacy: Using Blockchain to Protect Personal Data, 2015 IEEE CS Security and Privacy Workshops, 2015.

Stoica, Ion et al., A Berkeley View of Systems Challenges for AI, Dec. 15, 2017.

* cited by examiner

MANAGEMENT OF ACCESS AUTHORIZATION USING AN IMMUTABLE LEDGER

REALTED APPLICATIONS

This application is a non-provisional patent application claiming priority from U.S. Patent Provisional Patent Application 63/012,320 filed Apr. 20, 2020.

FEDERALLY SPONSORED RESEARCH AND DEVELOPMENT

This invention was made with government support under NSF 1547164 awarded by the National Science Foundation—Office of Advanced Cyberinfrastructure. The government has certain rights in the invention.

BACKGROUND OF THE INVENTION

1) Field of the Invention

This system is directed to a significant improvement in the encryption technology and encryption process by providing computer readable instructions for improved integration of the key-encryption-key (KEK) and can use an immutable ledger data structures to provide for an efficient management of data access permissions and access rights that are indelibly documented, provide for anonymous distribution of rights and provide for increased resilience to denial-of-service attacks resulting in a more secure information system.

2) Description of the Related Art

Developments in data networks, data storage, electronic communications and information technology systems have greatly increased the ability to access and process large amounts of data over a computer network. Further, global communication systems have virtually removed geographic boundaries to data access and allow access globally. The ability to access data globally has reduced the ability to maintain the confidentiality and privacy of information and created security concerns and privacy issues on a scale not before seen. Attempts to protect such data from unauthorized accessed and misuse have been subject to some mitigation attempts such as U.S. Pat. Nos. 8,666,065, 5,220,606; 5,539,827; 5,809,140; 2002/0095604 and 2011/0142230. These conventional techniques typically include encrypting data prior to storage or transmission.

Encryption may be defined as the process of transforming data, using a sophisticated algorithm, to encrypted data that is unreadable to anyone other than those possessing a password (e.g., key). For encrypted data to be accessed, decryption must occur, which is the reversal of the encryption process, thereby allowing the data to be unencrypted and therefore readable.

Traditionally, these data protections involve encryption using a single key or code. However, the encryption based on the single code often makes these protection techniques vulnerable to unauthorized access (e.g., hacking). Further, as the encryption is performed only after the data has been recorded in the document, an unauthorized user may access the data before being encrypted, for example, during the time when the data is being transmitted, written to a record, or otherwise recorded on a document or other file.

Methods of encryption can use symmetric key management which is when both sender and receiver have the same key. This structure is in opposition to asymmetric keying which is where the sender has one key presented to the public and a private ("secret") key only provided to those allowed to decrypt the information. Current asymmetric cryptography techniques are considered vulnerable to attack by future quantum computers, whereas symmetric keys do not share that vulnerability. Under the symmetric method, all the users (including senders and receivers) share the same key, so it is no longer effectively secret. However, there are advantages to symmetric keys in that they are faster as they are computationally more efficient than asymmetric-key (e.g., public key) cryptography. Therefore, symmetrical keys are commonly used to protect larger volumes of information, such as the confidentiality of data in transit or in storage. Symmetric cryptography requires all users of specific data secured by symmetric cryptography to share a secret key. To the contrary, asymmetric-key cryptography requires only one party to know a private key and other parties to know the corresponding public key. Therefore, it is more difficult to maintain an audit trail of symmetric keys.

Additional disadvantages with asymmetric and symmetric key cryptography include a lack of an audit trail. An additional disadvantage includes difficulties in distributing one or more keys so that they are received in a manner that provide anonymity.

It would be advantageous to have a system that is secure, efficient, and more easily managed that uses symmetric data-encryption-key (DEK) management that includes key distribution and key revocation.

Therefore, it is an object of the present invention to provide for a system that may provide security and protection of symmetric keys during key establishment, distribution, and revocation.

It is another object of the present invention to provide for a tool that may provide for error detection and recovery in the event of detectable errors during the key distribution and key revocation process.

It is another object of the present invention to provide for a system that may provide an audit trail of key distribution and revocation.

It is another object of the present invention to provide for a system that may distribute keys anonymously.

BRIEF SUMMARY OF THE INVENTION

The above objectives are an accomplished computerized system for management of access authorization using an immutable ledger comprising: a server having a computer readable medium and in communications with an immutable ledger; a set of computer readable instructions stored on the computer readable medium configured for: receiving a set of data, encrypted the set of data with a data-encryption-key and storing the encrypted data on the immutable ledger; creating a key tree having a node associated with a user, creating a key-encryption-key associated with the node and the user; and, distributing the key-encryption-key to the user wherein the key-encryption-key is configured to decrypt the data-encryption-key thereby providing access to the data for the user.

The data-encryption-key can be a first data-encryption-key and the set of computer readable instructions can be configured to create a second data-encryption-key, re-encrypting the data with the second data-encryption-key, encrypt the second data-encryption-key with the key-encryption-key, thereby providing a timeframe wherein the data was encrypted with the first data-encryption-key.

The set of computer readable instructions can be configured to store the re-encrypted data on the immutable ledger and provide a time frame to remote users acing the immutable ledger. The key-encryption-key can be a first key-encryption-key and the set of computer readable instructions can be configured for creating a second key-encryption-key associated with re-encrypted data-encryption-key, distributing the second key-encryption-key to a second user so that a second user can decrypt the data. The set of computer readable instructions can be configured to distribute the key-encryption-key out of band. The set of computer readable instructions can be configured to create a data-encryption-key generation record representing the generation of a data-encryption-key and storing the data-encryption-key generation record on the immutable ledger and create a data encryption record representing the encryption of the data and storing the data encryption record on the immutable ledger.

The key tree can be a first key tree having a first set of users and the set of computer readable instructions can be configured to remove a user from the first set of users to provide for a second set of users and modifying the key tree to reflect the second set of users, invalidate an existing key-encryption key, create a key-encryption-key invalidation record representing an invalidation of the key-encryption-key and storing the key-encryption-key invalidation record on the immutable ledger.

The system can have a set of user computer readable instructions configured for: retrieve data from a disparate computer medium in communications with the computer device, encrypting the data with a data-encryption-key; storing the encrypted data on the distributed ledger; receiving a key-encryption-key from a key tree, and, encrypting the data-encryption-key with the key-encryption-key so that a user associated with the key-encryption-key can anonymously access the data.

The system can include a set of computer readable instructions included with the server and configured for receiving data from the disparate computer medium; creating a data-encryption-key; encrypting the data with the data-encryption-key; storing the encrypted data on the distributed ledger; accessing a key tree having a node associated with a user; retrieving a key-encryption-key associated with the node, encrypting the data-encryption-key with the key-encryption-key, thereby providing access to the data to the user.

The key tree can include user nodes wherein each user node corresponds to a user and each user possesses all the key-encryption-keys along a path from the user node to a root node. The system can be in communications with a user computer device wherein the user computer device can be configured to: retrieve encrypted data from the distributed ledger in communications with the user computer device, decrypt the encrypted data-encryption-key with a user key-encryption-key associated with the user computer device and, decrypting the encrypted data according to the decrypted data-encryption-key.

The set of computer readable instructions can be configured to determine if a decryption attempt occurred using an invalid key-encryption-key. The data-encryption-key and the key-encryption-key can be symmetrical keys. The system can create the key tree.

The system can include embedding the use of key trees into an immutable ledger, such as a blockchain, that can provide a system to efficiently manage data access using the key tree. The system is self-documenting, which allows data forensics functionality to be used to determine access and to which version of the data exists. Using the immutable ledger to update data access permissions allows functionality not yet seen before and provide such access in a privacy preserving manner. This system also improves prior disadvantages such as lack of denial-of-service (DoS) attacks resistance since the immutable ledger is more resistant to such attacks.

This system addresses the protection of symmetric keys during a key establishment, distribution, and revocation. This system can also manage error detection and recovery in the event of detectable errors during the key distribution and key revocation process. This system can enable efficient symmetric key cryptography-based data access permissions, provide for access rights that are indelibly documented, provide for anonymous distribution of rights due to the adoption of immutable technology and can be more resilient to DoS attacks.

Generally, this system uses cryptography to safeguard symmetric keys in that it can be arranged in a binary tree and minimizes the number of update transactions needed for modifying access authorizations. The distributed ledger (e.g., immutable ledger or blockchain structure) supports efficient look up and indelible storage.

The system can provide for symmetric key management, which includes symmetric key establishment, distribution, and revocation. The system can use computer readable code that can be configured to use a Key-Encryption-Key (KEK) tree (or key-encryption/wrapping-key) to encrypt DEKs and/or KEKs in a distributed ledger.

The system can include a server having a computer readable medium where the services can be in communications with an distributed ledger; a set of computer readable instructions can be stored on the computer readable medium and configured for: creating a key tree having at least one node and having a key-encryption-key ("KEK") associated with each node, storing new KEK(s) encrypted with the current KEK(s) on the distributed ledger, and, distributing the new encrypted KEK(s) to the user wherein the KEK(s) is configured to decrypt a data-encryption-key ("DEK" or new replacement KEK) associated with the user that can also be stored on the distributed ledger. The set of computer readable instructions stored on the computer readable medium can be configured for creating a DEK associated with at least one user, encrypt data using the DEK associated with at least one user, storing the encrypted data on a disparate computer medium (that can include a database) in communications with the server, encrypting the DEK prior to storing the DEK on the distributed ledger, distributing the KEK out of band, creating a DEK generation transaction representing the generation of a DEK and storing the DEK generation transaction on the distributed ledger, modifying an existing DEK, creating a DEK modification transaction representing the modification of the DEK and storing the DEK modification transaction on the distributed ledger and revoking an existing DEK, creating a DEK revocation transaction representing a revocation of the DEK and storing the DEK revocation transaction on the distributed ledger.

The system can include a user computer device in communications with the server and the distributed ledger having a user computer readable media and a set of user computer readable instructions configured for: retrieving encrypted data from a disparate computer medium in communications with the user computer device, retrieving an encrypted DEK from a distributed ledger, decrypting the DEK with a KEK received from the server, and, decrypting the encrypted data according to the decrypted DEK.

The set of computer readable instructions stored on the computer readable medium can be configured for: creating a key-encryption-key ("KEK") associated with at least one user, storing the KEK on the distributed ledger, distributing the KEK to the user, creating a DEK associated with the user, encrypting the DEK with the KEK, storing the encrypted DEK on the distributed ledger, encrypting data using the DEK, and encrypted data using the DEK and, storing the encrypted data on the disparate computer medium. The distributed ledger can be an immutable ledger such as a blockchain. The set of computer readable instructions stored on the computer readable medium can be configured for creating a key tree having KEKs associated with one or more users. The key tree can include nodes wherein each node corresponds to a user and each user possesses all the KEKs along a path from the user's node to a root node. The key tree transactions can be stored on the distributed ledger.

The set of computer readable instructions stored on the computer readable medium can be configured for determining if a user attempted to decrypt encrypted data with an improper DEK or KEK. The disparate computer medium can be distributed among multiple remote locations. The KEK and/or the DEK can be symmetrical keys.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

Although the description of the invention contained herein contains many specifics for the purposes of illustration, anyone of ordinary skill in the art will appreciate that many variations and alterations to the following details are within the scope of the invention. Accordingly, the description of the invention is set forth without any loss of generality to, and without imposing limitations upon, the claimed invention.

This system can include an immutable audit trail of every Data-Encryption-Key ("DEK") created and distributed, provide for cost-efficient mining, provide for a lightweight mining (LWM) algorithm, use an open platform for quick deployment on existing distributed platform (e.g., IBM Hyperledger) and provide for optimization where a key tree is balanced after changes to ensure a minimal number of encryption operations for key distribution occur.

Figure 1:
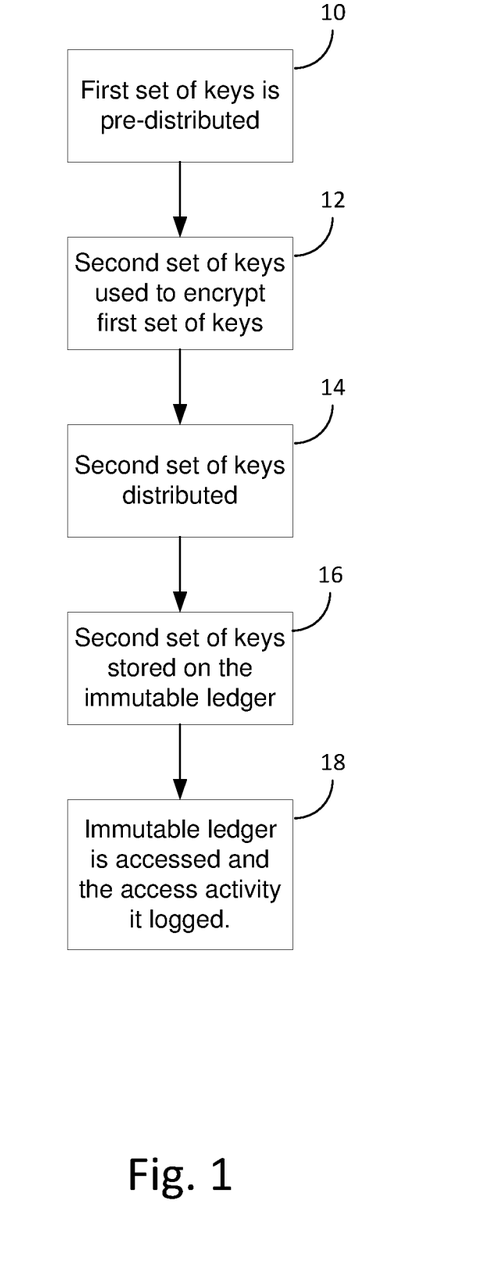
FIG. 1 is a flowchart of aspects of the invention.

The system allows for the combination of an immutable ledger which provides for distributed indelible data store with encryption keys so that an efficient way of distributing symmetric keys is provided. This system results in an efficient system for establishing symmetric keys. Referring to FIG. 1, a set of key-encryption-keys (KEKs) is provided that have been pre-distributed at 10. The KEKs can be generated so that there is one KEK per node in a key tree. There is also an initial set of keys ($KEK_{S1}$) that can be used to encrypt a data-encryption-keys DEKs at 12. The second set of keys ($KEK_{S2}$) can be distributed at 14. The second set of keys ($KEK_{S2}$) can be stored on the immutable ledger at 16 allowing for the distribution of the $KEK_{S2}$ to the nodes of the key tree. The subsequent set of keys ($KEK_{S2}$) can be generated and used to re-encrypt the DEKs so that only users that have a key in the $KEK_{S2}$ can decrypted and access the data. The system can initialize with the data owner having a predetermined key-tree having pre-distributed keys (KEKs). Each node of the key tree can have a key and the key tree and its keys can be stored on the immutable ledger.

Using symmetrical keys with an immutable ledger provides advantages over the traditional asymmetric keys. For example, when a user accesses the immutable ledger, a log of such access and the individual and information accessed can be maintained at 18. Specific access can be given to users of the immutable ledger so that access can be evidenced. In one illustration, there can be a certain project having project data. The project data can be encrypted and can be accessed by a first set of individuals. At some point, there can be different version of the project data and the access to the project data can be removed or added for one or more of the individuals that can be associated with the project. In the event that someone's access is removed, the project data can be re-encrypted with a subsequent set of KEKs and this subsequent set of KEKs can be distributed to one or more nodes on the pre-determined key tree. Further, to increase security, the KEKs can be periodically changed so that changed keys can be sent to individuals associated with the nodes to allow continued access. For example, the project data can be encrypted with an initial $DEK_{s1}$. During or after the project, the project data can be encrypted with a subsequent $DEK_{s2}$. These subsequent $DEK_{s2}$ can be encrypted with the KEKs effectively limiting access to the project data to only those having keys in the set of KEKs.

In operation, this system can be used to verify access to encrypted documents and discover the source of a release of project data. In the event that project data is made public, especially an unauthorized release, the system, by only allowing a limited number of individuals access, the source of the "leak" may be ascertainable by the system. For example, if a certain version of the product data (e.g., a document included in the project data) is publicly released, this system can identify and verify the individual or individuals that had access to the project data at a certain period of time by using the version of the KEKs used to access the released project data. This information can be used to identify a potential source of the unauthorized release of the information publicly. Such information can provide valuable verifications in judicial proceedings of other venues.

Figure 2:
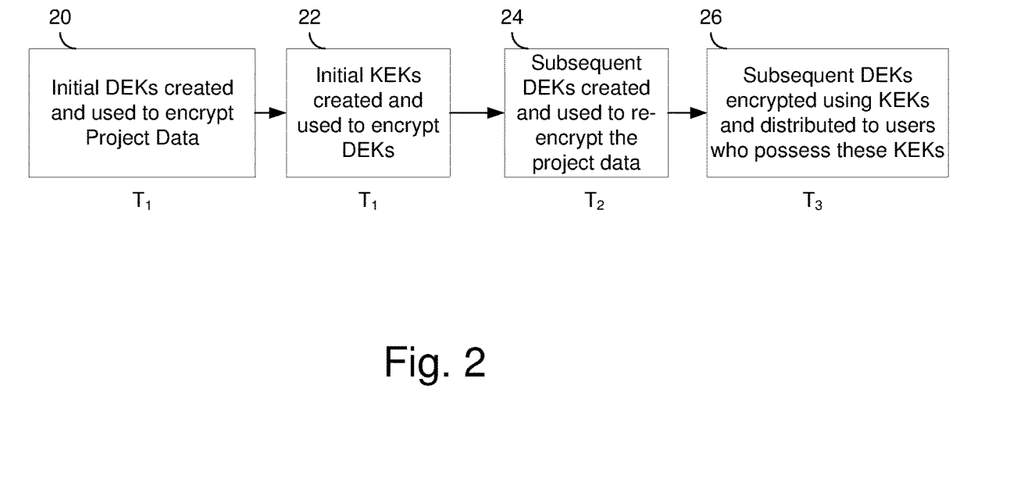
FIG. 2 is a schematic of aspects of the invention.
Figure 3:
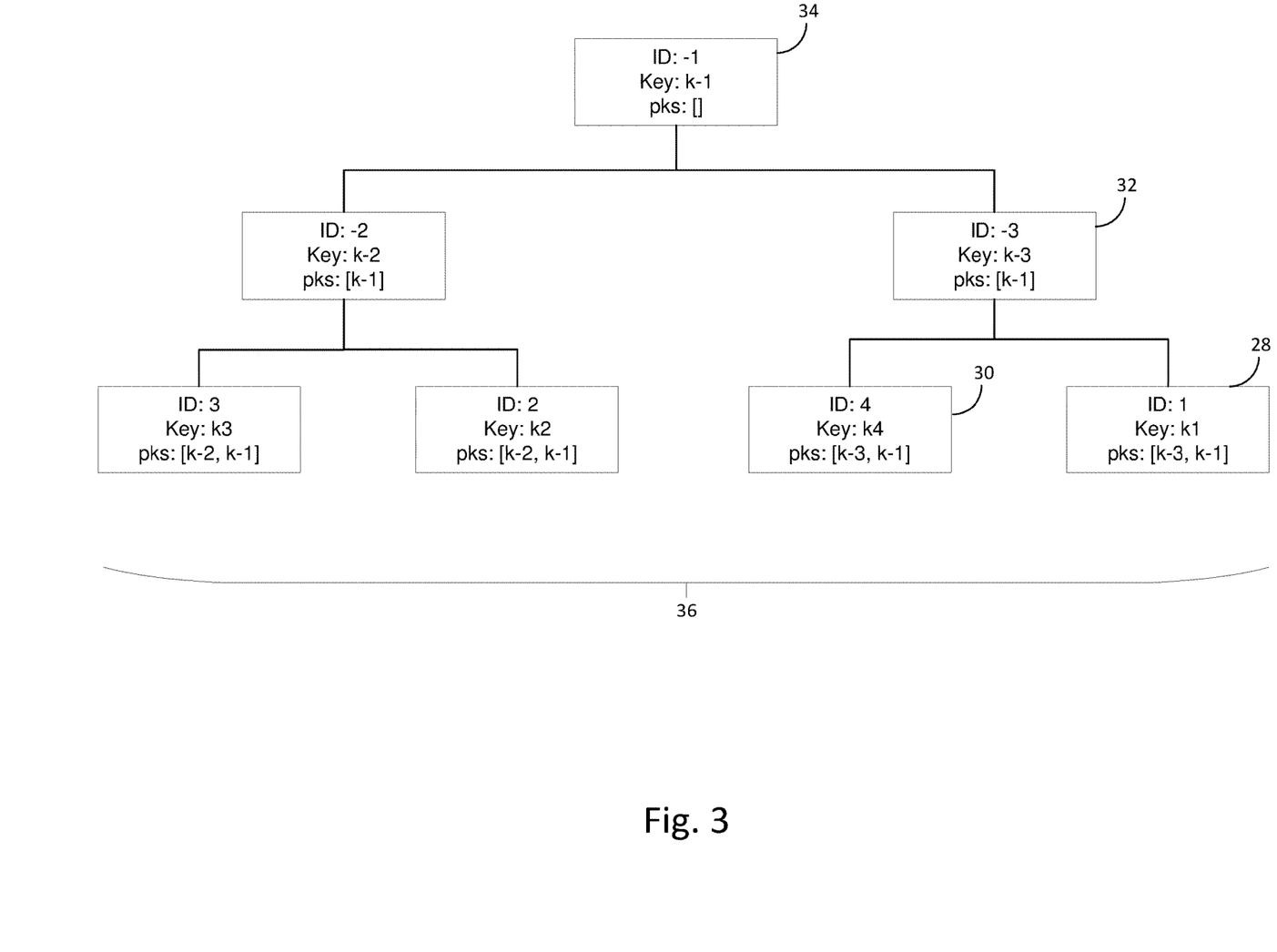
FIG. 3 is a flowchart of aspects of the invention; and,
FIG. 4 is a schematic of aspects of the invention.

Referring to FIG. 2, an illustration of one embodiment of the system is shown to provide for an audit trail of the project data encryption and access is shown. The initial project data is encrypted with a DEK at 20 at a first time period $T_1$. An initial set of KEKs are created and used to encrypt the DEK at time $T_1$ as shown as 22. In this example, the initial set of KEKs are distributed to four users A through D. At a time $T_2$ a second DEK can be created and used to re-encrypt the project data at 26 and distributed to the user that have the KEKs. The initial set of KEKs can be distributed out of band and can be distributed independently of the present system or the KEKS can be provided to user by the present system.

In one embodiment, if the data owner wishes for user D to no longer have access to the project data, the project data can be encrypted with a new DEK at $T_2$. The new DEK can be encrypted with the corresponding KEKs of users A through C and the new DEK, encrypted, can be sent to users A through C. Therefore, user D can no longer decrypt the DEK and therefore cannot decrypt the project data. The KEKs that are to be used to encrypt the new DEK can be determine by the key tree.

If access, including unauthorized access, to the data occurred at a time after $T_2$, the unauthorized access would not be related to user D as user D's access to the project data was removed prior to the unauthorized access.

In one embodiment, the KEKs can be updated periodically, for example at time $T_4$ where this new set of KEK's can be created and used to re-encrypt the DEKs. The subsequent set of KEKs can be distributed to the users. This update to the KEKs does not necessarily change the access rights to the project data but can assist with establishing time frame when KEKs were in use. Therefore, if access is associated with a key of the KEKs, the time frame when such access can be determined and can assist with the source of the access, including unauthorized access.

The distribution of the project data, DEKS and the KEKs can be stored on the immutable ledger so that an audit of access rights can be provided and used for, among other reasons, determining potential sources of such access, including unauthorized access and data leaks.

This system being distributed, allows encrypted data to exist in multiple locations while preventing the ability to modify the data in the immutable ledger. Further, the distributed data is encrypted so that access is controlled. Further, the specific individuals that have access are not known reducing or eliminating the risk of social engineering for the keys. These anonymous distributions of rights allow for the encrypted data to be distributed on an immutable ledger and because the immutable ledger is being used by multiple individuals, the specific identity of one individual is not tied to a specific set of encrypted data.

The use of the immutable ledger and global access to the immutable ledger allows an individual to download keys that can be used to store data and obtain the keys (e.g., KEKs and DEKs) with anonymity. The immutable ledger can include a temporal storage system where a second record stored on the immutable ledger includes information about a first record so that it is known that the second record was stored on the immutable ledger at a time after the storing of the first record. The data can be stored in any number of locations, locally or remotely, distributed, or centralized or other configurations. This system provides for multiple individuals to access encrypted data (by providing them with proper keys) without each individual knowing that the other individuals accessed the encrypted data. Therefore, multiple individuals can access encrypted data without their specific identities being revealed. This functionality is advantageous and a substantial improvement to the current state of the art by using a distributed encrypted ledger rather than any one entity storing and controlling the data and/or access. Further, control over the distribution of the data is removed from a single entity as it is placed on a distributed ledger.

In one application, this system can reduce or remove the risk of a denial of service for a server that uses, stores and distributes authentication keys. When a server is accessed to verify a key and the server (a potentially single point of failure) is not available, then the requesting computer can have a response that is either (a) a determination that the key(s) is good and allow the action or (b) determine that the key(s) is not valid and deny the next, and potentially subsequent actions. Traditionally the use of certificates for validation means that the validity of the certificates relies upon the response from the server so that a DoS attack on the server impacts each certificate. The distributed structure of the current system, contrary to traditional systems, reduces or eliminates the risk of a DoS attack given the large number of servers on an immutable distributed ledger.

This system improves the state of the art by, in one embodiment, using a balanced binary tree structure to efficiently manage KEKs so that the number of update transactions required for access authorization is minimized. In this system, user credentials can exist on each node of the key tree, which leads to efficiencies. At the key tree leaves (e.g., level 0), the key for that node can represent $20$ (e.g., 1) nodes. At level 1, keys can provide for $21$ (e.g., 2) nodes. At level 2, the key tree can provide for 4 nodes, for example. The root key can be used to provide information to all users, this system's structure provides for the minimization of the set of cryptographic computations needed.

The system includes a distributed authentication protocol to provide for avoidance of single point failure vulnerability. The system has lessened bottleneck(s) on a network due to the innate nature of binary key trees. The system is resistant to collusion attacks as this system is self-documenting, allowing determination of who has or had access to which version of the data at a particular time. This system includes integration with immutable ledgers such as blockchain data structures. The immutable ledger can be distributed providing for resistance to denial-of-service attacks. The system can be less susceptible or immune to traffic analysis attacks as well.

In operations, while anyone can download the tree, only those with the correct keys (one or the valid keys in the current KEKs) can access keys on the distributed ledger. This configuration results in preventing anyone observing internet traffic from being able to infer which users that are performing various roles and tasks in the system. Therefore, this system controls access to keys even though it is distributed on an immutable ledger. Data access is also controlled in that the user seeking access must have the corresponding keys, else the data cannot be accessed. Therefore, if the user seeks to retrieve the wrong keys, the user cannot access key(s) to decrypt the data. By using the key tree, user access can be maintained, monitored, and controlled as the key tree provides information concerning which user had access to what keys at what time.

For example, if there are multiple versions of data (e.g., versions 1-5) the key tree can show which user had access to which version at which time. Therefore, in the event of any unauthorized release of data (e.g., a user violating release rights or authorizations), it can be determined which user has access to the data and therefore the potential release (e.g., "leak") sources can be identified. In another example, if data is leaked due a security breach, knowing the users that had access to the data allows the breach investigation to be focused on those specific user's devices which can assist in the breach investigation.

The system also can improve efficiencies by having a method for selectively determining what is stored on the immutable ledger and what is not. This determination can be based upon the desired audit trail for the data, the reduction of data leakage and to promote anonymity.

This system is directed to provide privileged access management using data encryption to maintain data integrity by ensuring data can only be accessed and modified by appropriate users. The system can be used to establish an audit trail for the DEK management system using the key tree and a distributed ledger. A DEK management system can include generation, distribution, storage, use, revocation, and replacement of DEKs.

Referring to FIG. 2, we see that there can be multiple users and keys. For example, users can be ID: 1 shown as 28 through ID: 4 shown as 30 where ID: 4 and ID: 1 can be grouped with ID: −3 shown as 32. Each node (ID) can have a different KEK and identifier. Therefore, for any set of nodes (e.g., KEKs) there is a small number of encryptions needed to distribute an initial or new KEKs. In one example, for a new encrypted DEK file to be placed on the immutable ledger, the DEK can be encrypted with the key k-1 at node 34 and the encrypted file can be published so that all four users can access the encrypted data because all four users are under this node. However, if only one user, such as ID:4 is to be granted access, the DEK is encrypted with key k4 so that only ID:4 can access the unencrypted data. If the DEK is encrypted with k-3, then users ID:4 and ID: 1 can access the unencrypted data. In this example, user ID:1 would have three keys (k1, k-3, k-1) associated with the user.

In another example shown in FIG. 1, if a key update is desired for every user for a specific data item, one new DEK is generated, encrypted with the root key and put on the ledger. If new KEK are desired for every user (ID: 1, ID: 2, ID: 3, ID: 4), multiple new KEKs (e.g., seven) can be generated. Four encryptions are performed with the leaf keys: new KEKs K-1, K-2 and K3 are encrypted with the old K3, the new KEKs K-1, K-2, and K2 are encrypted with the old K2, new KEKs K-1, K-3 and K4 are encrypted with the old K4, and the new keys K-1, K-3 and K1 are encrypted with the old K1. These net items can be placed on the distributed ledger.

A data owner has a set of data or other information (e.g., data) and wishes to maintain its data integrity by ensuring that the data or other information can only be accessed and modified by appropriate users. The data owner creates a key tree 34 that can be used to manage access to different portion of the data. A user can be an entity that can be associated with a leaf node of the key tree by the data owner. Each user can possess all the KEKs along the path from the related leaf node to the root node at 36. A user uses the proper KEK to decrypt DEKs posted on a distributed ledger that is related to that user. Each action, modification, addition, or subtraction to the key tree can be a key tree transaction and stored on the distributed ledger.

The key tree 36 can be a binary tree used for managing DEKs and KEKs. Each node of the key tree can be associated with a KEK. Each leaf node can correspond to a user, who possesses all the KEKs along the path from the leaf node to the root node.

The owner can use the key tree to manage data access among a group of users. For example, node 32 can be associated with lead nodes 29 and 30 that can correspond to users, respectively. Any change made to the key tree can be posted on the blockchain that can provide a reliable audit trail of the key tree, transactions, and changes.

Figure 4:
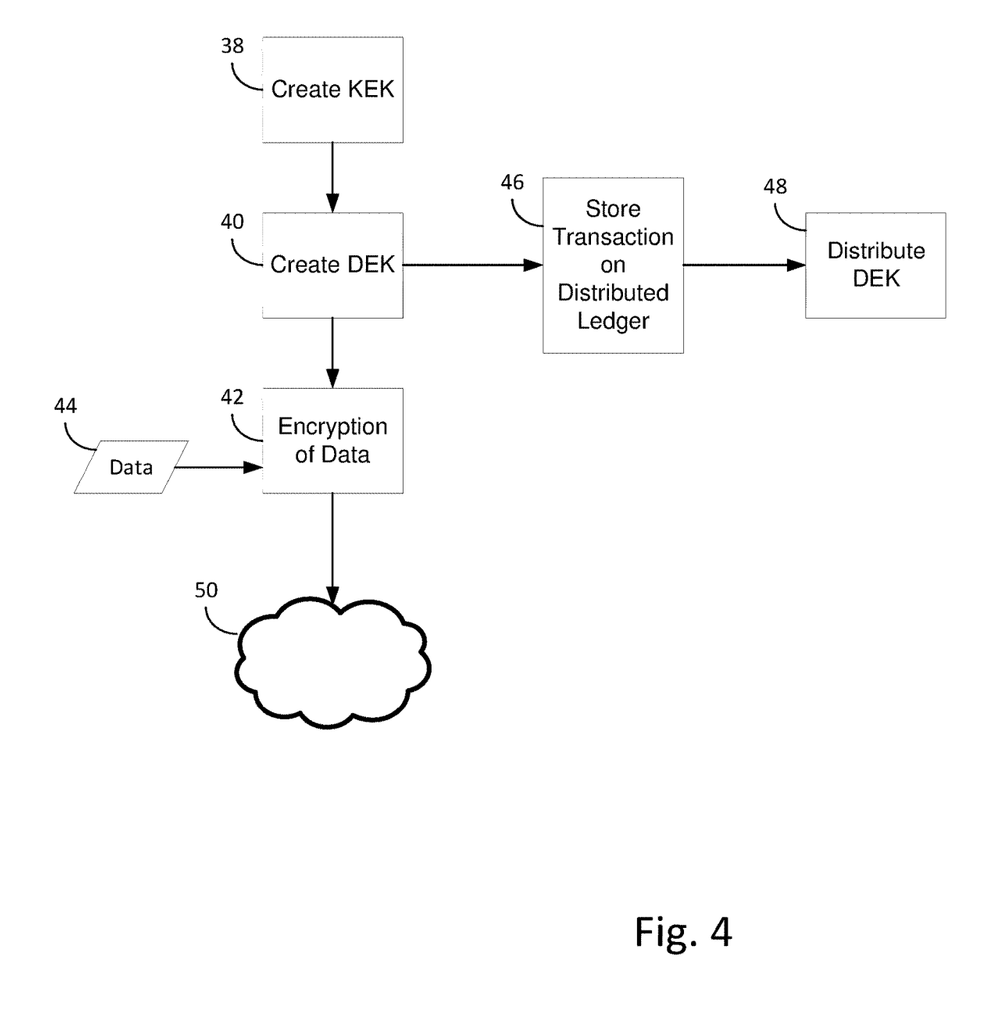

Referring to FIG. 4, the data owner can create a KEK at 38. A KEK is a symmetric key that can be used to encrypt other cryptographic keys such as DEK(s) at 40. The KEKs are created by the data owner and configured to be distributed to corresponding users according to the key tree. In one embodiment, the initial KEKs can be distributed to users that are not associated with an established private, secure communications channel providing for an out-of-band distribution or out-of-band user. Afterwards, the users can view any updates to their KEKs by retrieving the information from an immutable ledger such as a blockchain. The KEK can be a symmetric key meaning that the KEK can be used for both encryption of plaintext and decryption of ciphertext.

The data owner can create a data-encryption-key ("DEK"), that can be used to encrypt the data 42 at 44 for data that the owner desires for only certain users to be able to access. Once created, the DEK can be encrypted and stored on the distributed ledger at 46. The DEK for the associated user can then be retrieved and/or distributed to the user at 50. Therefore, the distribution of the DEK from the data owner can be immutably recorded and provide for an audit trail of activity associate with the data.

The data itself can be stored in a disparate computer medium at any location 48 (such as a disparate database) accessible to the user and not limited to storage on the distributed ledger including local computer readable medium, local areas network having computer devices with computer readable medium, wide area networks with computer devices with computer readable medium, service farms, the cloud and any combination. The DEK can then be encrypted by one or more the corresponding KEK and stored on the blockchain. Users can then download from a distributed ledger one or more DEKs that are associated with them by decrypting them with their KEK. The user can retrieve the data and use the decrypted DEK to read the data that was intended to be accessible to that user. In one embodiment, the KEKs can be used to encrypt DEKs that are used for encrypting data.

The key tree owner creates all KEKs and distributes them to the appropriate users. The owner can also add and remove users from the ability to access the data. The owner can create the DEKs and uses the KEKs to distribute these DEKs to the appropriate or desired users. The owner can also update the distributed ledger with transactions reflecting access and permissions to access the data. The owner can also append new transactions reflecting access and permissions to access the data.

In operation, the data owner may then want to allow a user 1 and a user 4 to access the data. In this example, the data owner generates a DEK encrypted by KEK for user 1 and user 4. A transaction is created for this encrypted DEK file and stored on the block chain. This process can result in the data being encrypted using a DEK and stored in a disparate (e.g., remote) computer medium so that only users with access to the DEK can read the data.

This system can provide a reliable audit trail of the key tree and signed cyphertext of DEK modifications and provide users needed keys to decrypt and view their relevant data, these keys can be posted on a distributed ledger. Access to the data created, owned, or controlled by the data owner can be limited to users already possessing the corresponding KEKs. Updates to access rights to the data can be posted to the distributed ledger as changes are made. Therefore, the history of all user access rights who have been given access to data modifications can be stored in a distributed ledger. Changes to entries within existing portion (e.g., blocks) stored on the distributed ledger are infeasible with sufficient distribution of users and nodes. This property of a distributed ledger, especially blockchain, allows for an immutable record that can be used to certify that only a certain set of users has access to specific version of the data. This property can be used to show the limited number of users that had access to the data in case of an event such as a data leak.

This system can provide for user access to be anonymous and to remain anonymous. When changes are made to the key tree, a corresponding update can be posted on the distributed ledger by the data owner. Users can then access the distributed ledger and download the update. However, only the user who has the relevant KEK can decrypt and view the update. Therefore, a user can only view information relevant to that user by decrypting it with the user's KEK. Further, DEK modifications can only be made by the data owner. Data access rights information are not accessible to entities without KEKs. For those with KEKs, they can only access entries associated with them. By keeping the identities of users from other entities on the tree, information about access rights for users who share a specific KEK cannot be leaked. Since the trees can be rebalanced and there is no need to share identities of users possessing KEKs. Further, mapping of KEKs can be kept confidential so that user identities are anonymous and only the key tree administrator knows who has access rights to specific data or a file.

This system also can provide for user data access anonymity. If Internet traffic is monitored, the traffic patterns for all participants will appear equivalent so that it is difficult if not impossible to tell which users have access to which files by surveilling the distributed leger access.

Further, the availability of the system can be greatly enhanced. The data owner can distribute key-related updates by posting it on the distributed ledger that is widely distributed and synchronized across a network. This system will therefore remain available as long as any copy of the distributed ledger is available. Any DoS attack will have to scale at the same rate as the distributed system providing for a durable and available low-cost infrastructure.

Security of the present system can be enhanced when the entries to the blockchain are encrypted using the appropriate, current KEK and all new KEK's and DEK's can originate with the owner of the data. Further, KEKs and DEKs can be distributed via the distributed ledger encrypted using the appropriate current KEK before being posted to the distributed ledger.

The description herein may be presented in terms of programming procedures modules or objects which are executed on a computer or a network of computers and are contained in a set of computer readable instructions. These procedural, modular, and object descriptions and representations are the means by which those skilled in the art must effectively convey the substance of their work to others skilled in the art. A procedure, object, module, or set of instructions as herein described, is generally a self-consistent sequence of steps leading to a desired result. These steps are those requiring physical manipulations of physical quantities. Usually, these quantities take the steps of electrical or magnetic signals capable of being stored, transferred, combined, compared, or otherwise manipulated within a computer readable medium. More specifically, a procedure, object, or module is a section of computer readable code which is designated to perform a specific task or tasks. The actual computer executable code may not be contained with one file or storage medium in order to constitute a procedure, object, or module. Procedures, objects, or modules may receive information (input) passed by another calling procedure, object, or module and may transmit information (output) to the calling procedure. The host is computer hardware capable of creating and processing computer readable instructions and it is not limited to a single computer. For example, storage medium, network communications, and main processing could be executed by three physically separate computers and would still constitute a host. Therefore, the term "host" is not intended to be limited to a single computer.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A computerized system for management of access authorization using an immutable ledger comprising:
    a server in electronic communication with an immutable ledger;
    a database in electronic communication with the server;
    a set of server computer readable instructions stored on the server configured for:
        receiving a set of data,
        providing a data-encryption-key,
        encrypting the set of data with the data-encryption-key to provide an encrypted dataset and storing the encrypted dataset on the database,
        creating a key tree having a set of user nodes wherein each user node corresponds to a user,
        creating a key-encryption-key associated with a node on the key tree,
        encrypting the data-encryption-key with the key-encryption-key,
        storing the data-encryption-key on the immutable ledger;
    a user computer device in electronic communication with the immutable ledger wherein the user computer device include user computer readable instructions configured for:
        retrieving the data-encryption-key from the immutable ledger,
        retrieving the encrypted data from the dataset,
        receiving the key-encryption-key from the server according to the key tree wherein the key-encryption-key is configured to decrypting the data-encryption-key with the key-encryption-key, and,
        decrypting the dataset with the decrypted data-encryption-key thereby providing access to the dataset.

2. The system of claim 1 wherein the key-encryption-key is a first key-encryption-key and the server is configured to provide a second key-encryption-key, re-encrypt the data-encryption-key with the second key-encryption-key to provide a modified data-encryption-key, store the encrypted second data-encryption-key on the immutable ledger thereby providing a timeframe according to the data-encryption-key and the modified data-encryption-key-according to storing the data-encryption-key and the modified data-encryption-key on the immutable ledger.

3. The system of claim 1 wherein the key-encryption-key is a first key-encryption-key and the server is configured for creating a second key-encryption-key, re-encrypting the data with the second key-encryption-key, distributing the second key-encryption-key to the user according to the key tree.

4. The system of claim 1 wherein the server is configured for distributing the key-encryption-key out of band.

5. The system of claim 1 wherein the server is configured for creating a data-encryption-key generation record representing the generation of a data-encryption-key and storing the data-encryption-key generation record on the immutable ledger.

6. The system of claim 1 wherein the server is configured for creating a data encryption record representing the encryption of the data and storing the data encryption record on the immutable ledger.

7. The system of claim 1 wherein the key tree is a first key tree having a first set of users and the server is configured for removing a user from the first set of users to provide for a second set of users and modifying the key tree to reflect the second set of users.

8. The system of claim 1 wherein the server is configured to invalidate an existing key-encryption-key, create a key-encryption-key invalidation record representing an invalidation of the key-encryption-key and storing the key-encryption-key invalidation record on the immutable ledger.

9. A computerized system for management of access authorization using an immutable ledger comprising:
a server in communication with an immutable distributed ledger having a set of server computer readable instructions configured for:
retrieving data from a disparate computer medium wherein the server is in electronic communication with the disparate computer medium,
encrypting the data with a data-encryption-key,
storing the data on a database in electronic communication with the server,
storing the encrypted data-encryption-key on the immutable distributed ledger,
distributing a key-encryption-key to a user according to a key tree stored on a computer device, and,
encrypting the data-encryption-key with the key-encryption-key so that a user assigned with the key-encryption-key can anonymously access the data;
a user computer device configured to:
receiving the key-encryption-key from the computer device,
retrieving the data-encryption-key from the immutable distributed ledger, and,
decrypt the data-encryption-key according to the key-encryption-key, and,
decrypt the encrypted data and using the decrypted data-encryption-key.

10. The system of claim 9 wherein the data-encryption-key is a first data-encryption-key and the server is configured for re-encrypt the data with a second data-encryption-key, encrypt the second data-encryption-key with the key-encryption-key and store the second data-encryption-key on the immutable distributed ledger thereby providing a timeline wherein the first data encryption key was in use and when the second data-encryption-key was placed in use.

11. The system of claim 9 wherein the server is configured to receive a second key-encryption-key and re-encrypting the data-encryption-key with the second key-encryption-key and distribute the second key-encryption-key according to the key tree.

12. A computerized system for management of access authorization using an immutable ledger comprising:
a server in communications with a distributed ledger and a disparate computer medium;
a set of server computer readable instructions included with the server and configured for:
receiving data from the disparate computer medium,
creating a data-encryption-key,
encrypting the data with the data-encryption-key according to a key encryption key,
storing the encrypted data on the disparate computer medium,
storing the data-encryption-key on the distributed ledger,
accessing a key tree having a node associated with a user,
distributing the key-encryption-key associated with the node according to the key tree, and
a user computer device adapted to:
retrieve the data-encryption-key from the distributed ledger,
decrypt the data-encryption-key with the key-encryption-key,
retrieve encrypted data from disparate computer medium,
decrypt the data according to the decrypted data-encryption-key_thereby providing access to the data to the user.

13. The system of claim 12 wherein the key tree includes user nodes wherein each user node corresponds to a user and each user possesses all the key-encryption-keys along a path from the user node to a root node.

14. The system of claim 12 wherein the data-encryption-key is a first data-encryption-key and the user computer device is configured to:
retrieve a second data-encryption-key from the distributed ledger,
decrypt the second data-encryption-key according to the key-encryption-key,
decrypt the data according to the second data-encryption-key wherein the first data-encryption-key is associated with a first timeframe and the second data-encryption-key is associated with a second time frame.

15. The system of claim 12 wherein the is configured to determine if a decryption attempt occurred using an invalid key-encryption-key.

16. The system of claim 12 wherein the data-encryption-key and the key-encryption-key are symmetrical keys.

17. The system of claim 12 wherein the server is configured to create and store the key tree.

18. The system of claim 12 wherein the data-encryption-key is a first data-encryption-key and the server is configured to re-encrypt the data with a second data-encryption-key, store the re-encrypted data on the disparate computer medium, encrypt the second data-encryption-key with the key-encryption-key thereby providing a timeframe where first data-encryption-key was in use.

* * * * *